United States Patent
Lucci

[15] 3,662,979
[45] May 16, 1972

[54] LITTER BASKET MOUNTING AND LOCKING MEANS

[72] Inventor: Ciro J. Lucci, 402 Foster Avenue, Brooklyn, N.Y. 11230

[22] Filed: Aug. 4, 1970

[21] Appl. No.: 60,892

Related U.S. Application Data

[63] Continuation-in-part of Ser. No. 765,065, Oct. 4, 1968, Pat. No. 3,568,966.

[52] U.S. Cl.............................248/154, 248/201, 248/203, 248/313
[51] Int. Cl............................................................F16n 13/00
[58] Field of Search..................248/154, 201, 202, 203, 311, 248/313, 313 TC; 211/4, 8; 70/58, 62; 292/67, 106, 114, 192

[56] References Cited

UNITED STATES PATENTS

| 634,441 | 10/1899 | Capen et al. | 70/62 |
| 977,612 | 12/1910 | Gilbert | 70/62 |
| 3,053,495 | 9/1962 | Schmier | 248/313 |
| 3,568,966 | 3/1971 | Lucci | 248/154 |

FOREIGN PATENTS OR APPLICATIONS

| 466,193 | 10/1928 | Germany | 248/311 |

Primary Examiner—William H. Schultz
Attorney—Jacobs and Jacobs

[57] ABSTRACT

A wire or mesh screen litter basket with or without upper and lower flanges is mounted by its top and bottom on a supporting post adapted to be anchored in the ground in such manner that the litter basket is maintained above ground level and can be locked in supported position from which it can be released only by unlocking with the proper key.

2 Claims, 10 Drawing Figures

Patented May 16, 1972
3,662,979
2 Sheets-Sheet 1
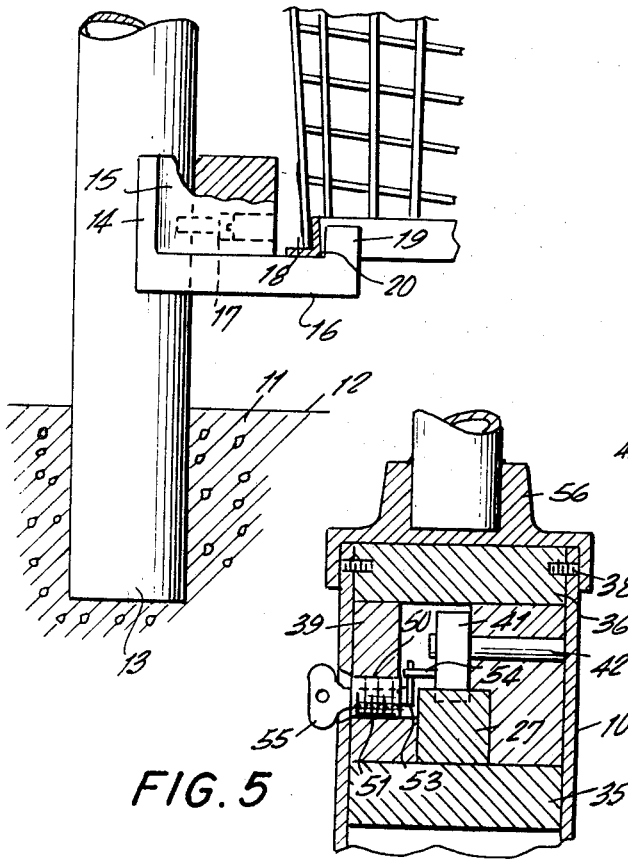
FIG. 1
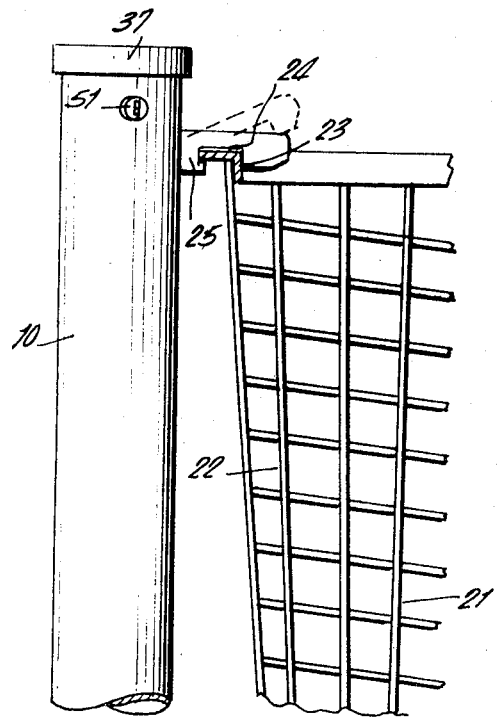
FIG. 2
FIG. 3
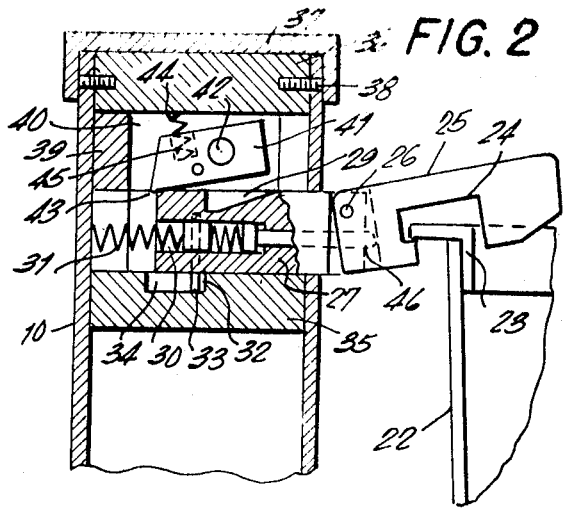
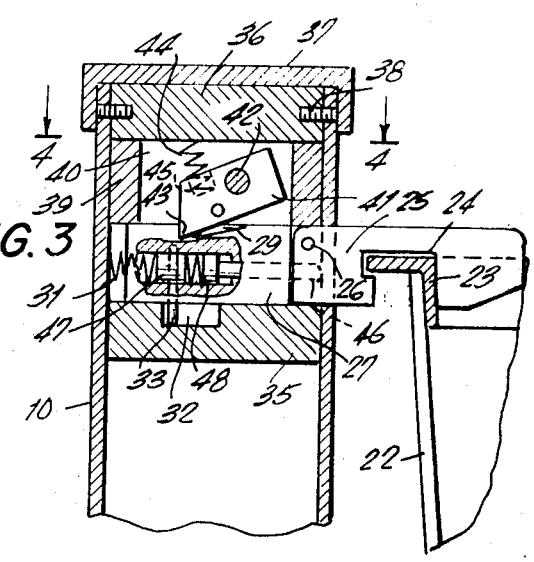
FIG. 4
FIG. 5
INVENTOR.
CIRO J. LUCCI
BY Jacobs & Jacobs
ATTORNEYS Patented May 16, 1972
3,662,979
2 Sheets-Sheet 2
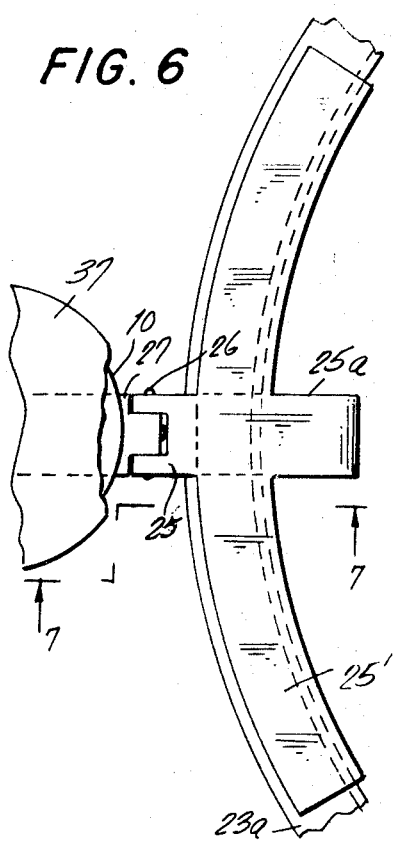
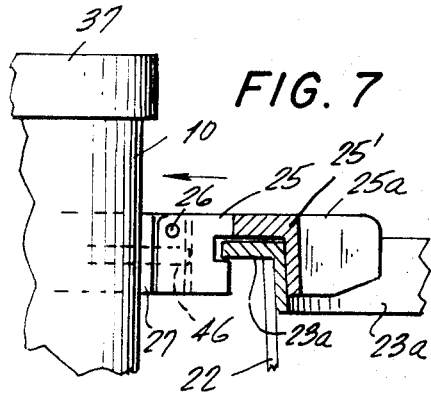
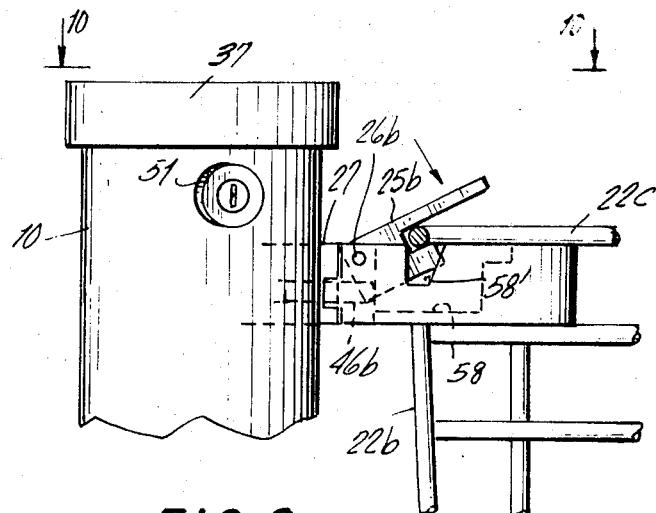
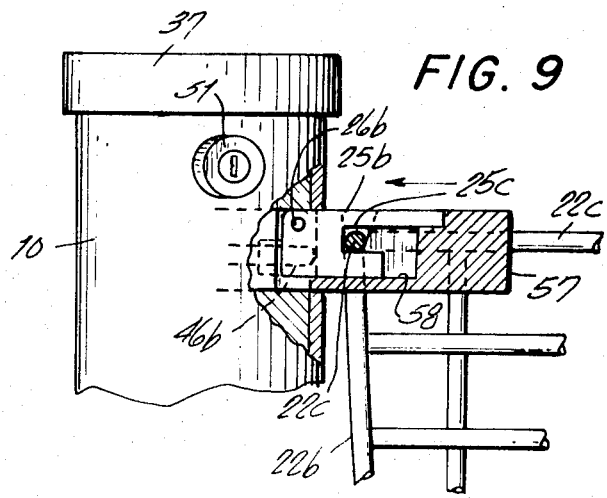
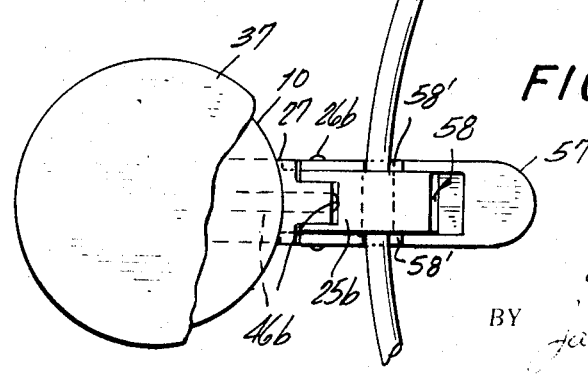
INVENTOR.
CIRO J. LUCCI
BY
Jacobs & Jacobs
ATTORNEYS

LITTER BASKET MOUNTING AND LOCKING MEANS

This application is a continuation-in-part of U.S. Pat. application Ser. No. 765,065 filed Oct. 4, 1968, now Pat. No. 3,568,966.

The invention relates to litter basket mounting and locking means wherein the litter basket is made of wire or mesh screen having upper and lower flanged or unflanged annular rims by means of which it may be locked in position above ground level to a specially anchored supporting post which is firmly secured in the ground or in cement. Special locking means prevent the litter basket when in locked position from being removed except by one who has the proper key to unlock the mechanism provided in the supporting post.

Preferred embodiments of the invention are illustrated in the accompanying drawing in which:

FIG. 1 is an elevational view of the supporting post, a part of the litter basket and means for holding it in place;

FIG. 2 is a fragmentary sectional view, partly in elevation, on an enlarged scale taken through the upper portion of FIG. 1 and showing the mechanism within the supporting post in litter basket unlocking position;

FIG. 3 is a view similar to FIG. 2 but showing the mechanism in litter basket locking condition;

FIG. 4 is a transverse sectional view partly in plan taken on line 4—4 of FIG. 3;

FIG. 5 is a view of the upper portion of the supporting post of FIG. 1 at a 90° angle thereto with a portion broken away to expose certain parts of the internal construction and showing the key inserted in actuatable position;

FIG. 6 is a fragmentary plan view of an adapter form of the invention;

FIG. 7 is a part elevation and part section on line 7—7 of FIG. 6;

FIG. 8 is a fragmentary elevation of a further form of the construction of FIG. 7 with the parts unlocked;

fIG. 9 is similar to FIG. 8 with the parts locked; and

FIG. 10 is a plan view on line 10—10 of FIG. 8.

Referring to the construction shown in FIGS. 1 to 5 of the drawing, numeral 10 designates a supporting post which is preferably hollow or which has a hollow upper portion and which is made of stainless steel, chromium plated base metal or any other suitable metallic or non-metallic material. Post 10 is solidly anchored in the ground either in earth or in cement as indicated at 11 with a portion of the post 10 extending below ground level 12 as indicated at 13 in any suitable or desired manner with any appropriate subterranean or sub-surface extension so as to prevent the post from being readily removed.

Above the ground level 12 the post 10 is provided with an external arcuate bracket 14 secured to the post by a suitable fastening instrumentality and this bracket 14 has a recessed or web-like portion 15 and a radially outwardly extending portion 16 which is unitary therewith or secured thereto, when the bracket is made in two pieces, by the countersunk attaching screw 17. Portion 16 provides a recess 18 bounded by a terminal upwardly extending portion 19 so that, as shown in FIG. 1, the lower annular flanged rim 20 of the litter basket 21 fits into said recess 18, the bracket 14 constituting a support for the litter basket, and depending upon the size of the litter basket, the bracket 14 may be varied in its vertical location on post 10 as will be understood by change of elevation of screw 17, which may penetrate into the post, by means of which the bracket may be held in position other than the position shown in FIG. 1 when screw 17 penetrates post 10 rather than abutting it, a vertical series of holes is provided. It will be observed further that the litter basket 21 is supported above ground level thereby avoiding obstruction or interference with cleaning or washing of the ground or cement surface. The litter basket 21 is preferably made of intersecting or interwoven vertical and horizontal wires 22 and this construction is greatly preferred because it keeps the weight of the litter basket to a minimum and provides easy access to the interior whenever needed as in case of fire in the basket contents. The litter basket may, for example, be made of stainless steel wires, aluminum or any other rust-resistant, fireproof light weight strong but somewhat flexible and yieldable material.

At its upper end the litter basket has a similar flanged annular rim 23 which fits into the recess 24 in the pivotal arm 25 pivoted at 26 to the pivotal base bar 27 which extends through the wall of the post 10 into the interior thereof where the construction is preferably as shown in FIGS. 2 and 3. From these latter figures it will be seen that the bar 27 has on its upper edge intermediate its ends a notch 29 and an end counterbore 30 for the reception of one end of the helical spring 31, the other end of which abuts against the inner surface of the opposite wall of the post. The transverse lower member 35 is provided with a recess 32 in its upper edge for the reception of the lower end of the vertical guide pin or rod 33 which is capable of moving with the bar 27 to the extent permitted by the length of the said recess 32 in the upper surface of the said lower transverse member 35 which is held in place within the post in any suitable manner such as a shrink fit or by means of screws (not shown but which may be like pins 38) or the like. It will be noted further that the longitudinal length of the bar 27 is less than the internal diameter of the hollow post 10 so that the bar 27 may move diametrically outwardly and inwardly within or with respect to the post for locking and unlocking purposes as will be further explained below. There is also an upper transverse closure member 36 and an optional but preferred cap 37 for the top of the post. Member 36 is held in position by threaded pins or the like 38 and between the upper and lower transverse members 36 and 35 there is an annular spacer element 39 which maintains the relative positions of the parts and provides the space 40 within which locking and unlocking action takes place.

In this space 40 there is disposed a locking link 41 pivotally mounted at 42 and so arranged that it is set at a slight angle to the bar 27, the locking link 41 being of generally trapezoidal shape so that it has a lowermost inner corner portion 43 which can either slide along the upper edge of the bar 27 or which can drop into the notch 29 for locking purposes as shown in FIG. 3, it being particularly noted also that link 41 is spring-urged in counter-clockwise direction toward locking position by means of the helical spring 44 one end of which is received in a recess 45 in the upper edge of link 41 and the other end of which abuts against the under surface of the upper transverse closure member 36. A pin 46 acts as a lift means for link 41 when key (55) is inserted and turned. A comparison of FIGS. 2 and 3 clearly shows how the various described parts move and their acquired relationship when either in the unlocking position of FIG. 2 in which member 25 can be manually pivoted upwardly or in the locking position of FIG. 3 in which member 25 cannot be pivotally moved upwardly into basket-releasing position. Spacer 47 is held in place by vertical guide pin 33, added tension spring 48, and push pin 46 which in turn lifts pivotal arm of catch 25 into a raised position as shown in FIG. 2.

From FIGS. 4 and 5 it will be seen that there is a radial opening 50 through member 39 to permit access for the insertion by screwing of a cylinder 51 into annular spacer element 39 and holding it there by adjustment of set screw 52. The end of the cylinder has a tongue 53 which turns in an oval path. This tongue 53 engages pin 54 on locking link 41 and lifts locking link 41 releasing the pivotal base bar 27 and pivotal arm of catch 25 and moves same outwardly stopped by vertical guide pin 33 as part 41 moves outwards. The pivotal arm of catch 25 moves up by movement of push pin 46. In FIG. 5, the key 55 is shown in the cylinder 51 with tongue 53 engaged with pin 54 on locking link 41. Cap 56 can be used to hold an extension pipe for the purpose of mounting signs in place of cap 37 if it is desired to mount a sign on the post. Other specific forms of locks may replace the locking arrangement described.

The foregoing description will make it clear how the device is used and operated. Assuming the cap 37 is either press fitted or threaded on post 10 and kept there by flush pins hammered into place after assembly to prevent the cap from being removed and all the other parts to be in locking condition as shown in FIG. 3, the key 55 is inserted in the radial recess or opening 50 into contact with the rotating tongue 53 which moves into contact with pin 54 to lift the corner portion 43 of locking link 41 out of the notch 29 thereby permitting 41 to slide along upper surface of pivotal base bar 27 whereupon helical spring 31 urges base bar 27 radially outward to the position shown in FIG. 2. From this position the pivoted portion 25 of the base bar 27 can be manually pivoted upward on pivot pin 26 thereby freeing the upper rim 23 of the basket 22 and permitting the basket to be removed for emptying, cleaning or replacement.

When the basket is to be replaced and the parts locked into position the basket is re-positioned and then it is only necessary to apply an inward force by hand to pivoted arm 25 retracting bar 27 within the post 10, compressing helical spring 31 and the corner portion 43 of locking link 41 drops into the notch 29 under which conditions the device is locked so that the litter basket cannot be removed from the post without the use of the key.

In FIGS. 6 and 7 the post 10 is likewise provided with a cap 37 (or a cap 56) for the purposes already described and also with the retractable link 27 to which is pivoted at 26 the arm 25 constructed as described in connection with FIGS. 1 to 3, but the arm 25 in FIGS. 6 and 7 is provided with an arcuately extending adapter 25a overlying the upper annular flange 23 and particularly suitable for use in stabilizing already constructed litter baskets which may be undersized and/or when lower bracket 14 is a little too low. The main distinction over the construction of FIGS. 2 and 3 is that in those figures the upper annular rim 23 meets the arm opening correctly whereas in other respects the construction of bracket 25a operates in the same manner as 25, but with greater advantages.

In FIGS. 8 to 10 a form of the invention is illustrated in which the litter basket 22b has no upper annular flange nor any upper member other than top wire 22c. In order to accommodate the invention to such a basket the pivoted arm 25b having the pivot point 26b and actuated by the pin 46b has a slot or recess 25c which is only slightly greater in vertical height than the diameter of the upper wire 22c of the basket and, as will be observed from FIG. 9 in particular, the lower surface of the slot or recess 25c is of less horizontal extent than the upper surface thereof so that when arm 25b is retracted into the post 10 as shown in FIG. 9, a locking effect occurs with relation to the extension member 57 having the configuration illustrated and being rounded at its distal end to avoid sharp projections and also having a floor or bottom portion 58 for the slideable reception of the lower portion of arm 25b. In the relationship of the parts shown in FIG. 9, the basket 22b is secured in position against removal by anyone not possessing the proper key to fit the lock 51 whereas in FIG. 8 the same parts are shown in unlocked condition and wherein the arm 25b, due to the outward pressure of spring 31 (not visible), has moved link 27 forwardly so that it projects out of the post 10, thereby making it possible to move arm 25b upwardly around its pivot 26b and consequently releasing the basket which can then be readily removed for emptying or for repair or replacement as required.

It is understood that the foregoing is intended as illustrative and not as limitative and that within the spirit and scope of the appended claims modifications may be made as to details of construction size and shape.

What is claimed is:

1. Litter basket mounting and locking means comprising, in combination, a litter basket having top and bottom annular rims, a hollow supporting post adapted to be anchored in the ground, a fixed bracket mounted externally on said post above ground level and having an extension projecting therefrom with a recess in its upper surface for the reception of the bottom rim of the litter basket, a bar mounted within the post near the upper end thereof and less in length than the internal diameter of the post, said bar being movable diametrically with respect to the post, a portion pivoted to the bar and extending radially outwardly therefrom and having a recess for the reception of the top rim of the litter basket, means normally urging the bar outwardly in a radial direction in the outermost position of which a link is pivotable upwardly to permit removal of the litter basket, the bar being manually retractable into the post in which position the pivotal connection to the link is concealed and locked within the post and the litter basket is in locked supported position, the upper and lower basket rims being wires.

2. Litter basket mounting and locking means comprising, in combination, a litter basket having top and bottom annular rims, a hollow supporting post adapted to be anchored in the ground, a fixed bracket mounted externally on said post above ground level and having an extension projecting therefrom with a recess in its upper surface for the reception of the bottom rim of the litter basket, a bar mounted within the post near the upper end thereof and less in length than the internal diameter of the post, said bar being movable diametrically with respect to the post, a portion pivoted to the bar and extending radially outwardly therefrom and having a recess for the reception of the top rim of the litter basket, means normally urging the bar outwardly in a radial direction in the outermost position of which a link is pivotable upwardly to permit removal of the litter basket, the bar being manually retractable into the post in which position the pivotal connection to the link is concealed and locked within the post and the litter basket is in locked supported position, the upper rim of the basket being wire and the pivoted portion being recessed for reception thereof.

* * * * *